United States Patent
Hasegawa et al.

(10) Patent No.: US 11,754,466 B2
(45) Date of Patent: Sep. 12, 2023

(54) MODE-DEPENDENT LOSS MEASUREMENT DEVICE AND MODE-DEPENDENT LOSS MEASURING METHOD

(71) Applicant: SUMITOMO ELECTRIC INDUSTRIES, LTD., Osaka (JP)

(72) Inventors: Takemi Hasegawa, Osaka (JP); Tetsuya Hayashi, Osaka (JP); Yuki Kawaguchi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 121 days.

(21) Appl. No.: 17/445,241

(22) Filed: Aug. 17, 2021

(65) Prior Publication Data

US 2021/0372882 A1 Dec. 2, 2021

Related U.S. Application Data

(63) Continuation of application No. PCT/JP2020/006927, filed on Feb. 20, 2020.

(30) Foreign Application Priority Data

Feb. 22, 2019 (JP) ................................. 2019-030210

(51) Int. Cl.
*G01M 11/00* (2006.01)
*G02B 6/02* (2006.01)

(52) U.S. Cl.
CPC ........ *G01M 11/333* (2013.01); *G01M 11/335* (2013.01); *G02B 6/02042* (2013.01)

(58) Field of Classification Search
CPC .... G01M 11/333; G01M 11/35; G01M 11/31; G01M 11/33; G02B 6/02042;
(Continued)

(56) References Cited

U.S. PATENT DOCUMENTS 9,952,382 B2 * 4/2018 Hayashi ............. G02B 6/02271
10,203,265 B2 * 2/2019 Hayashi ................. G01M 11/35
(Continued)

FOREIGN PATENT DOCUMENTS

JP 2014-206517 A 10/2014
JP 2019-015584 A 1/2019
(Continued)

OTHER PUBLICATIONS

Sakamoto, Taiji et al., "Mode dependent loss characteristic in splice point for coupled multi-core fiber," Lecture proceedings of the2017 communication society conference of IEICE, Aug. 29, 2017, B-10-8, p. 124, including partial English-language translation.
(Continued)

*Primary Examiner* — Hoa Q Pham
(74) *Attorney, Agent, or Firm* — Faegre Drinker Biddle & Reath LLP (57) ABSTRACT

A mode-dependent loss measurement device measures a mode-dependent loss of a measurement target optical fiber including a coupled MCF. The device includes a light source, a light receiver, a mode coupled state changer, and an analysis unit. The light source inputs light to an input end of an excitation optical fiber including another coupled MCF. The light receiver detects a sum of powers of outputted light beams from a plurality of core end faces positioned on an output end of the measurement target optical fiber. The mode coupled state changer changes a mode coupled state of the excitation optical fiber. The analysis unit obtains a mode-dependent loss of the measurement target optical fiber from variations in optical powers detected by the light receiver.

13 Claims, 6 Drawing Sheets

(58) Field of Classification Search
CPC .... G02B 6/02271; G02B 6/02214; G02B 6/036;
G02B 6/02
USPC ............... 356/73.1; 372/6, 64; 385/12, 126
See application file for complete search history.

(56) References Cited

U.S. PATENT DOCUMENTS

| | | | |
|---|---|---|---|
| 11,022,523 B2* | 6/2021 | Hayashi | .................. G02B 6/02 |
| 2013/0251320 A1* | 9/2013 | Hayashi | ............. G02B 6/02042 385/100 |
| 2017/0351022 A1 | 12/2017 | Nakanishi et al. | |
| 2018/0202895 A1 | 7/2018 | Hayashi | |
| 2019/0011623 A1 | 1/2019 | Hayashi et al. | |

FOREIGN PATENT DOCUMENTS

| | | |
|---|---|---|
| WO | WO-2016/152507 A1 | 9/2016 |
| WO | WO-2017/149910 A1 | 9/2017 |

OTHER PUBLICATIONS

Kobayashi, Tetsuya et al., "Verification of input-power dependence of free-space coupling multicore fiber devices," IEICE Technical Report, Aug. 22, 2019, vol. 119, No. 186, pp. 1-5, with English-language translation.

* cited by examiner

MODE-DEPENDENT LOSS MEASUREMENT DEVICE AND MODE-DEPENDENT LOSS MEASURING METHOD

CROSS-REFERENCE TO RELATED APPLICATIONS

This application is a continuation application of PCT/JP2020/006927 claiming the benefit of priority of the Japanese Patent Application No. 2019-030210 filed on Feb. 22, 2019, the entire contents of which are incorporated herein by reference.

TECHNICAL FIELD

The present disclosure relates to a mode-dependent loss measurement device and a mode-dependent loss measurement method.

BACKGROUND ART

A multi-core optical fiber (hereinafter, referred to as an "MCF") having a plurality of cores surrounded by a common cladding can increase a spatial density of an information transmission amount. Thus, the MCF is expected as a transmission medium that can efficiently use a limited cross-sectional area of a communication path such as an underground conduit and a submarine cable. Among MCFs, in a coupled multi-core optical fiber (hereinafter, referred to as a "CMCF") in which waveguide modes are coupled between a plurality of cores, since a distance between two adjacent cores is short, one optical fiber can have many cores. Accordingly, the CMCF can further increase the spatial density of the information transmission amount, and has high productivity.

Light inputted to any one of the plurality of cores at an input end of the CMCF is dispersed and guided to the plurality of cores by mode coupling while being guided. Thus, the light inputted to any one of the cores is outputted from the plurality of cores at an output end. Optical signals outputted from each of the plurality of cores are digitally coherent-received at the output end of the CMCF, and emission signals corresponding to original incident signals can be restored by performing multi-input multi-output (hereinafter, referred to as "MIMO") processing on the received signals.

However, the effectiveness of the MIMO processing decreases as a mode-dependent loss (hereinafter, referred to as an "MDL") which is a loss difference (a difference in a logarithmic scale) between propagation modes of the CMCF increases, and it is difficult to restore the signals. Accordingly, when a transmission path using the CMCF is constructed, it is necessary to manage the MDL in the entire transmission path to be low by measuring the MDL of the CMCF constituting the transmission path.

Patent Document 1 discloses a device and a method for measuring the MDL of the CMCF. In this device and method, light is inputted to a k-th spatial mode at an input end of a CMCF having N spatial modes, a power of light outputted from an m-th spatial mode is measured at an output end of the CMCF, and transmittance T(k, m) is obtained as a ratio of an output optical power to an input optical power in a linear scale. The transmittance T(k, m) is obtained by setting k and in to values in a range of 1 or more and N or less, and thus, a matrix of N rows and N columns having the transmittance T(k, m) as elements of a k-th row and an m-th column is obtained. The MDL in the linear scale is obtained as a ratio between a maximum value and a minimum value of N eigenvalues or singular values of the matrix.

CITATION LIST

Patent Literature

Patent Document 1: International Publication Pamphlet No. WO2017/149910

SUMMARY OF INVENTION

A mode-dependent loss measurement device according to the present disclosure is a device that measures a mode-dependent loss of a measurement target optical fiber, and a coupled multi-core optical fiber (CMCF) having a plurality of cores extending along a fiber axis and a common cladding surrounding the plurality of cores is applied as the measurement target optical fiber. As one aspect, the mode-dependent loss measurement device includes a light source, a light receiver, mode coupled state change means, and an analysis unit. The light source is optically coupled with an input end of an excitation optical fiber, and inputs light to the input end of the excitation optical fiber. As the excitation optical fiber, a coupled multi-core optical fiber (CMCF) having a plurality of cores extending along a fiber axis and a cladding surrounding the plurality of cores is applied. The light receiver is optically coupled with an output end of the measurement target optical fiber. The light receiver detects a sum of powers of outputted light beams from a plurality of core end faces positioned on the output end of the measurement target optical fiber during a period in which the light from the light source is inputted to the input end of the excitation optical fiber in a state in which an output end of the excitation optical fiber and an input end of the measurement target optical fiber are optically coupled with each other. The mode coupled state change means changes a mode coupled state of the excitation optical fiber. The analysis unit analyzes variations in optical powers detected by the light receiver during a period in which the mode coupled state of the excitation optical fiber is changing. The analysis unit obtains the mode-dependent loss of the measurement target optical fiber based on the magnitude of a variation in an insertion loss from the input end of the excitation optical fiber to the light receiver (hereinafter, simply referred to as an "insertion loss") obtained from the variations in the detected optical powers.

BRIEF DESCRIPTION OF DRAWINGS

FIG. 6 is a diagram illustrating a configuration of a mode-dependent loss measurement device 37 according to a

DESCRIPTION OF EMBODIMENTS

Details of Embodiment of Present Disclosure

First, contents of embodiments of the present disclosure will be individually listed and described.

(1) A mode-dependent loss measurement device according to the present disclosure is a device that measures a mode-dependent loss of a measurement target optical fiber, and a coupled multi-core optical fiber (CMCF) having a plurality of cores extending along a fiber axis and a common cladding surrounding the plurality of cores is applied as the measurement target optical fiber. As one aspect, the mode-dependent loss measurement device includes a light source, a light receiver, mode coupled state change means, and an analysis unit. The light source is optically coupled with an input end of an excitation optical fiber, and inputs light to the input end of the excitation optical fiber. As the excitation optical fiber, a coupled multi-core optical fiber (CMCF) having a plurality of cores extending along a fiber axis and a cladding surrounding the plurality of cores is applied. The light receiver is optically coupled with an output end of the measurement target optical fiber. The light receiver detects a sum of powers of outputted light beams from a plurality of core end faces positioned on the output end of the measurement target optical fiber during a period in which the light from the light source is inputted to the input end of the excitation optical fiber in a state in which an output end of the excitation optical fiber and an input end of the measurement target optical fiber are optically coupled with each other. The mode coupled state change means changes a mode coupled state of the excitation optical fiber. The analysis unit analyzes variations in optical powers detected by the light receiver during a period in which the mode coupled state of the excitation optical fiber is changing. The analysis unit obtains the mode-dependent loss of the measurement target optical fiber from the variations in the detected optical powers. Note that, the CMCFs constituting the excitation optical fiber and the measurement target optical fiber may be individually prepared, and a part of the CMCF constituting the measurement target optical fiber may be applied to the excitation optical fiber.

Note that, when the MDL of the measurement target optical fiber is measured by using the variation value of the insertion loss from the input end of the excitation optical fiber to the light receiver, it is necessary to set a length of the excitation optical fiber to be sufficiently shorter than a length of the measurement target optical fiber. Specifically, a ratio of the length of the measurement target optical fiber to the length of the excitation optical fiber is, for example, 10 or more, preferably 100 or more. In the present disclosure, the "coupled multi-core optical fiber (CMCF)" is an optical fiber in which an optical power incident one core at one end and propagated to the other end is emitted from two or more cores at the other end and a power emitted from any core does not exceed 67% of a total power emitted from the other end.

(2) As one aspect of the present disclosure, the mode coupled state change means may include a disturbance application unit that changes the mode coupled state of the excitation optical fiber by application of disturbance. As one aspect of the present disclosure, the mode coupled state change means may include a wavelength change unit that changes a wavelength of the light outputted from the light source. The mode coupled state change means may include phase modulation means for changing one or more phases of phases of light beams propagating through the plurality of cores in the excitation optical fiber.

(3) As one aspect of the present disclosure, the mode coupled state change means may include at least two elements of a first element, a second element, and a third element. Note that, the first element corresponds to a disturbance application unit that changes the mode coupled state of the excitation optical fiber by application of disturbance. The second element corresponds to the wavelength change unit that changes the wavelength of the light outputted from the light source. The third element corresponds to the phase modulation means that changes one or more phases of phases of light beams propagating through the plurality of cores in the excitation optical fiber. In such a configuration, the analysis unit selectively extracts a frequency component of the variations in the detected optical powers based on a frequency synchronized with a change in the mode coupled state caused by an operation of at least one element of the elements included in the mode coupled state change means in order to analyze the variations in the detected power.

(4) A mode-dependent loss measurement method according to the present disclosure measures a mode-dependent loss of a measurement target optical fiber including a CMCF having a plurality of cores extending along a fiber axis and a common cladding surrounding the plurality of cores. As one aspect, the mode-dependent loss measurement method includes a light input step, a light detection step, a mode coupled state change step, and an analysis step. In the light input step, light from a light source optically coupled with an input end of an excitation optical fiber including a CMCF having the above structure is inputted to the input end of the excitation optical fiber. In the light detection step, a sum of powers of outputted light beams from a plurality of core end faces positioned on an output end of the measurement target optical fiber is detected by a light receiver optically coupled with the output end of the measurement target optical fiber during a period in which the light from the light source is being inputted to the input end of the excitation optical fiber in a state in which an output end of the excitation optical fiber and an input end of the measurement target optical fiber are optically coupled with each other. In the mode coupled state change step, a mode coupled state of the excitation optical fiber is changed. In the analysis step, variations in optical powers detected by the light receiver are analyzed during a period in which the mode coupled state of the excitation optical fiber is changing. A mode-dependent loss of the measurement target optical fiber is obtained from the variations in the detected optical powers. Note that, the CMCFs constituting the excitation optical fiber and the measurement target optical fiber may be individually prepared, and a part of the CMCF constituting the measurement target optical fiber may be applied to the excitation optical fiber.

(5) As one aspect of the present disclosure, the mode coupled state change step may include a disturbance application step of changing the mode coupled state of the excitation optical fiber by application of disturbance. As one aspect of the present disclosure, the mode coupled state change step may include a wavelength change step of changing a wavelength of the light outputted from the light source. As one aspect of the present disclosure, the mode coupled state change step may include a phase modulation step of changing one or more phases of phases of light beams propagating through the plurality of cores of the excitation optical fiber.

(6) As one aspect of the present disclosure, the mode coupled state change step may include at least two sub-steps of a first sub-step, a second sub-step, and a third sub-step. Note that, the first sub-step corresponds to a disturbance application step of changing the mode coupled state of the excitation optical fiber by application of disturbance. The second sub-step corresponds to a wavelength change step of changing a wavelength of the light outputted from the light source. The third sub-step corresponds to a phase modulation step of changing one or more phases of phases of light beams propagating through the plurality of cores in the excitation optical fiber. In such a configuration, in the analysis step, a frequency component of the variations in the detected optical powers is selectively extracted based on a frequency synchronized with a change in the mode coupled state caused by an operation of at least one sub-step of the sub-steps included in the mode coupled state change step in order to analyze the variations in the detected optical powers.

(7) As one aspect of the present disclosure, it is preferable that a length of the measurement target optical fiber is 10 times or more of a length of the excitation optical fiber. As one aspect of the present disclosure, one end of the excitation optical fiber may be optically coupled with a branch device (fan-out device). Note that, the branch device is an optical component for optically coupling the plurality of cores in the excitation optical fiber to a plurality of single-core optical fibers. In such a configuration, the light source and the excitation optical fiber are optically coupled via the single-core optical fiber.

As described above, each of the aspects listed in the [Description of Embodiments of the Present Disclosure] is applicable to each of all the remaining aspects or all combinations of these remaining aspects.

Note that, in the device and the method disclosed in Patent Document 1, since it is necessary to measure the transmittance for each spatial mode, there is a problem that the MDL when the mode is branched becomes an error factor. Since the number of times of measurements increases in proportion to the square ($N^2$) of the number of spatial modes N, there is also a problem that the cost of the measurement device is high. According to the present disclosure, it is possible to measure the MDL of the CMCF at low cost by suppressing an error due to the MDL caused by the mode branch.

Details of Embodiment of Present Disclosure

Hereinafter, specific structures of a mode-dependent loss measurement device and a mode-dependent loss measurement method according to an embodiment of the present disclosure will be described in detail with reference to the accompanying drawings. Note that, the present disclosure is not limited to these examples, but is defined by the scope of the claims. The present disclosure is intended to include meanings equivalent to the scope of the claims and all modification examples within the scope. In the description of the drawings, the same components are denoted by the same reference signs, and the redundant description will be omitted.

Figure 1:
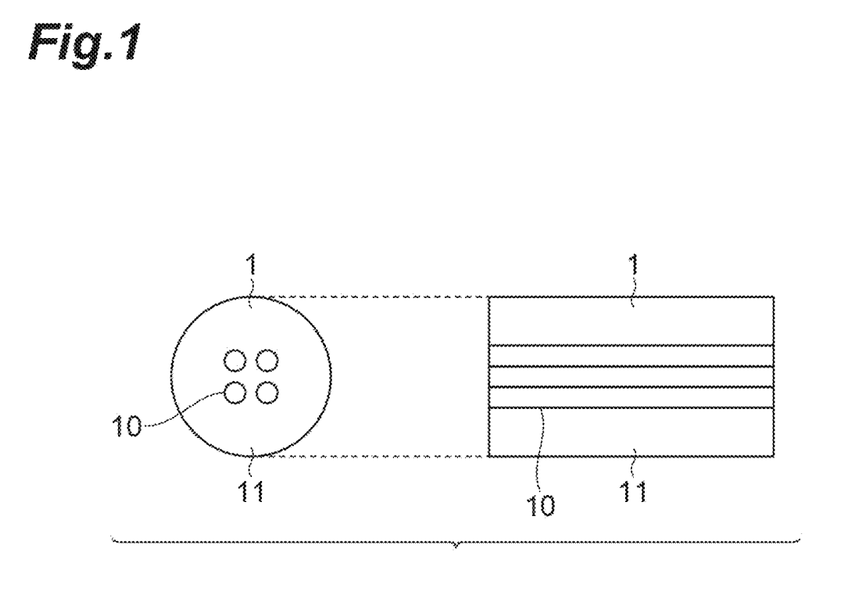
FIG. 1 is a diagram illustrating an example of a structure of a CMCF.

FIG. 1 is a diagram illustrating an example of a structure of a coupled multi-core optical fiber (CMCF). FIG. 1 illustrates a transverse cross section and a longitudinal cross section of a CMCF 1. The CMCF 1 includes a plurality of (four in FIG. 1) cores 10 extending along a fiber axis (corresponding to a central axis of the CMCF 1 extending along a longitudinal direction) and a common cladding 11 surrounding the plurality of cores 10. A refractive index of each core 10 is higher than a refractive index of the common cladding 11. Accordingly, the CMCF 1 has waveguide modes of light beams. Each core 10 and the common cladding 11 are typically comprised of silica glass, and the refractive indexes are adjusted by adding an additive such as Ge, F, Cl, or P. The common cladding 11 is protected from external damage by being covered with a resin (not illustrated).

The waveguide mode of each core 10 is significantly coupled with the waveguide mode of another adjacent core 10 (significant large mode coupling is caused). For example, a mode coupling coefficient is 0.1 [1/m] or more. In order to realize such significantly large mode coupling, it is preferable that the cores 10 have substantially the same composition and have substantially equal propagation constants. In order to have substantially equal propagation constants, it is preferable that the cores 10 are arranged at wide intervals so as not to cause a super mode with another adjacent core 10.

Figure 2:
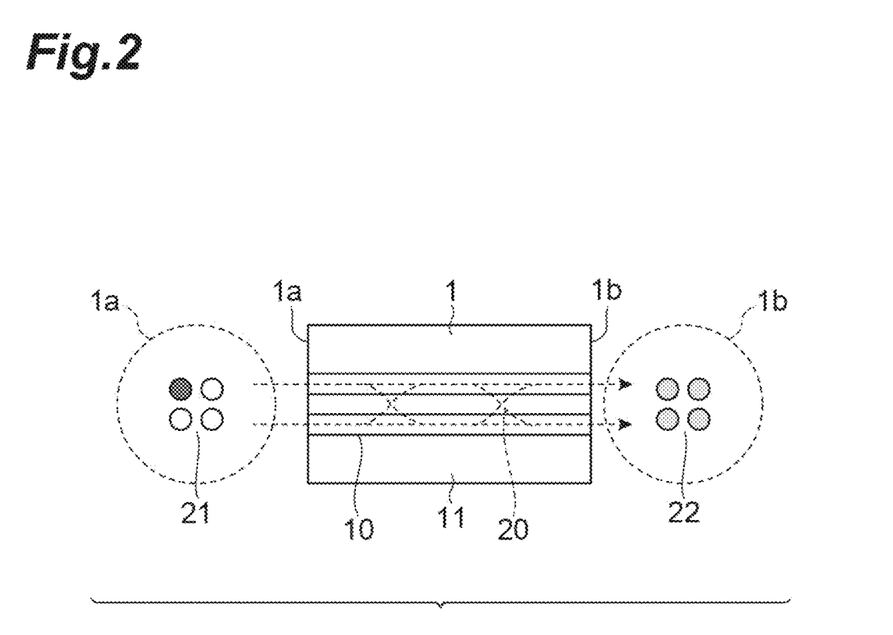
FIG. 2 is a diagram for describing mode coupling in the CMCF.

FIG. 2 is a diagram for describing the mode coupling in the CMCF. FIG. 2 illustrates an optical power distribution 21 of the plurality of cores 10 at an input end 1a (in the drawing, a region indicated by a broken line) of the CMCF 1 and an optical power distribution 22 of the plurality of cores 10 at an output end 1b (in the drawing, a region indicated by a broken line) of the CMCF 1 in addition to the longitudinal cross section of the CMCF 1. In the optical power distributions 21 and 22, magnitudes of optical powers are indicated by shading. When light is inputted to any one core 10 among the plurality of cores 10 positioned at the input end 1a of the CMCF 1, the light guided through the core 10 is coupled with another core 10 by mode coupling 20 caused during propagation. As a result, the optical power distribution 21 at the input end 1a is localized in any one core 10, whereas the optical power distribution 22 at the output end 1b is dispersed in the plurality of cores 10.

A position and a frequency at which the mode coupling is caused in the CMCF depend not only on the structure of the CMCF but also on refractive index variations due to the bending of the CMCF, the twisting of the CMCF, and the temperature or distortion of the CMCF. Accordingly, the position and the frequency at which the mode coupling is caused in the CMCF vary randomly. A ratio of the optical powers coupled from a certain core to another core also randomly varies. An expected value of a reciprocal of the frequency at which the mode coupling is caused per unit length of the CMCF is referred to as a mode coupling length. In a typical CMCF, the mode coupling length is 10 m or less. Accordingly, in a CMCF having a length of 100 m or more, since the mode coupling is caused cumulatively sufficiently large number of times during propagation, powers of light beams outputted from the plurality of cores that causes the mode coupling become substantially equal.

Since an action of the mode coupling is exchange of optical powers between modes, when there is no MDL, the sum of the optical powers is preserved even though the mode coupling is randomly caused. That is, when there is no MDL, the sum of the powers of the light beams outputted from all the cores 10 does not vary at the output end 1b. However, when there is the MDL, the position or the frequency of the mode coupling changes randomly, and thus, the sum of the powers of the light beams outputted from all the cores 10 also randomly varies at the output end 1b. The present inventors have found that the MDL of the CMCF can be measured by sufficiently causing random variations in the mode coupling and measuring variations in a loss of the CMCF at this time.

Figure 3:
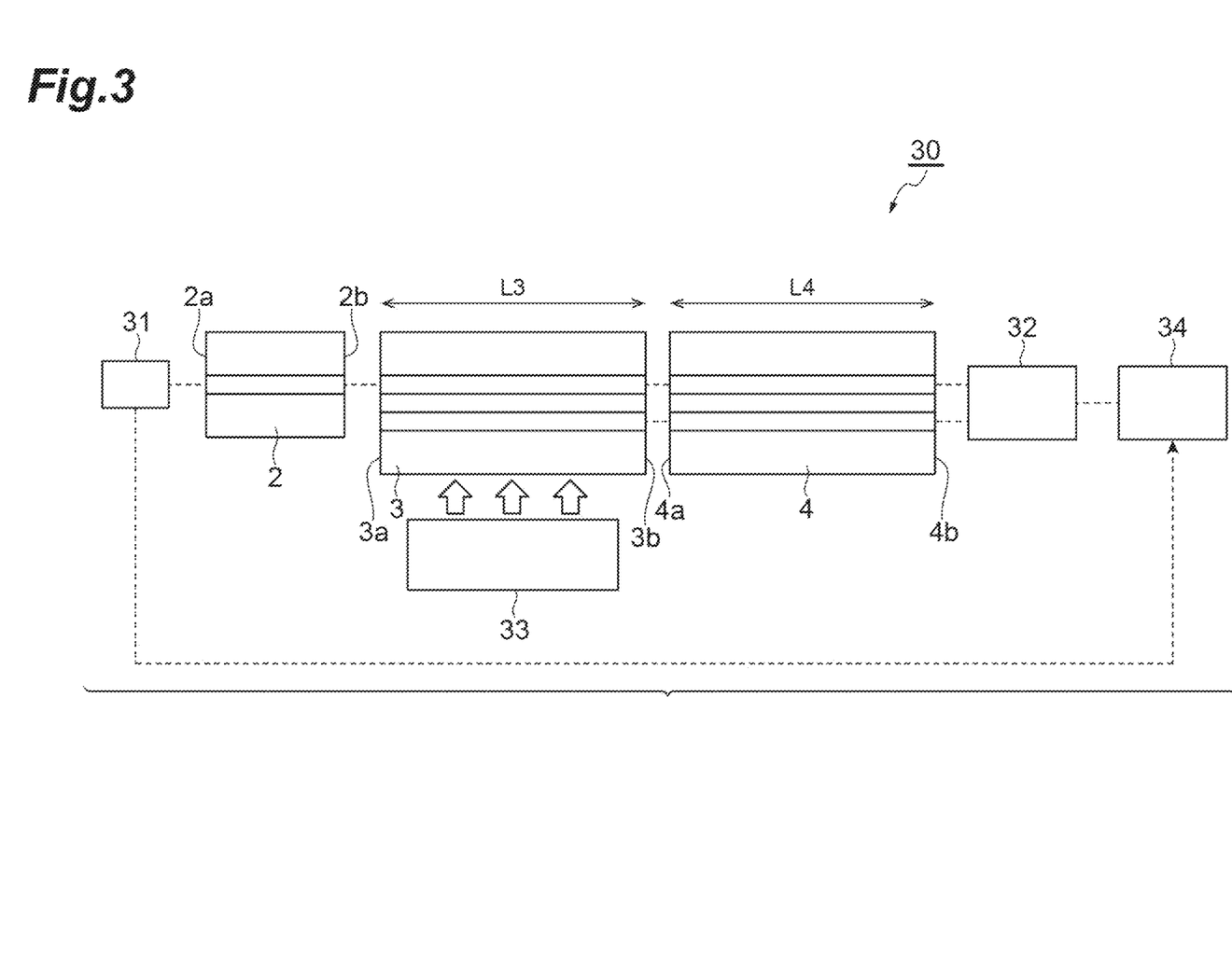
FIG. 3 is a diagram illustrating a configuration of a mode-dependent loss measurement device 30 according to a first embodiment together with an excitation optical fiber and a measurement target optical fiber.

FIG. 3 is a diagram illustrating a configuration of a mode-dependent loss measurement device (MDL measurement device) 30 according to the first embodiment together with an excitation optical fiber and a measurement target optical fiber. The MDL measurement device 30 includes a light source 31, a light receiver 32, a disturbance application unit 33 as mode coupled state change means, and an analysis unit 34. A coupling optical fiber 2, an excitation optical fiber 3, and a measurement target optical fiber 4 are arranged in order from the light source 31 toward the light receiver 32. The coupling optical fiber 2 may not be provided.

The light source 31 is optically coupled with an input end 2a of the coupling optical fiber 2, and inputs outputted light to cores of the coupling optical fiber 2 at the input end 2a. The coupling optical fiber 2 may be a single-core optical fiber.

The excitation optical fiber 3 is a CMCF. An input end 3a of the excitation optical fiber 3 is optically coupled with an output end 2b of the coupling optical fiber 2. The light beams outputted from the cores of the coupling optical fiber 2 at the output end 2b are inputted to one or two or more cores of the excitation optical fiber 3 at the input end 3a.

The measurement target optical fiber 4 is a CMCF as a target for measuring an MDL by the MDL measurement device 30. An input end 4a of the measurement target optical fiber 4 is optically coupled with an output end 3b of the excitation optical fiber 3. The light beams outputted from cores of the excitation optical fiber 3 at the output end 3b are inputted to cores of the measurement target optical fiber 4 at the input end 4a.

The excitation optical fiber 3 and the measurement target optical fiber 4 may be an input end side portion of a string of CMCFs and a portion subsequent to the input end side portion. The excitation optical fiber 3 and the measurement target optical fiber 4 may be the same as each other in terms of the arrangement of the cores in a longitudinal cross section and a refractive index profile, or may be different from each other in any of these points. The light beams outputted from one or two or more cores of the excitation optical fiber 3 at the output end 3b may be inputted to one or two or more cores of the measurement target optical fiber 4 at the input end 4a.

The light receiver 32 is optically coupled with an output end 4b of the measurement target optical fiber 4, and detects powers of the light beams outputted from all the cores of the measurement target optical fiber 4 positioned at the output end 4b.

The light outputted from the light source 31 propagates through the coupling optical fiber 2, and then is inputted to the cores of the excitation optical fiber 3 at the input end 3a. At this time, it is desirable that the coupling optical fiber 2 has a section bent at a predetermined diameter, and thus, a higher-order mode excited at the input end 2a is attenuated. As a result, the instability of an insertion loss due to the coupling of the higher-order mode of the coupling optical fiber 2 to the excitation optical fiber 3 can be suppressed.

The optical power distribution when the output end 3b of the excitation optical fiber 3 is coupled with the input end 4a of the measurement target optical fiber 4 differs from the optical power distribution when the output end 2b of the coupling optical fiber 2 is coupled with the input end 3a of the excitation optical fiber 3 depending on the mode coupling in the excitation optical fiber 3. The optical power distribution when the light beams are outputted from the output end 4b of the measurement target optical fiber 4 differs from the optical power distribution when the output end 3b of the excitation optical fiber 3 is coupled with the input end 4a of the measurement target optical fiber 4 depending on the mode coupling in the measurement target optical fiber 4.

The light beams outputted from all core end faces positioned on the output end 4b of the measurement target optical fiber 4 are received by the light receiver 32, and the sum of the optical powers is detected by the light receiver 32.

A mode coupled state in the excitation optical fiber 3 varies due to disturbance. The disturbance applied to the excitation optical fiber 3 in order to change the mode coupled state is a temperature, distortion, bending, twisting, and the like. This disturbance may be unintentionally applied or may be intentionally applied by the disturbance application unit 33. The disturbance application unit 33 is, for example, a "heater" or a "piezoelectric element".

The mode coupled state in the excitation optical fiber 3 varies, and thus, the optical power distribution when the output end 3b of the excitation optical fiber 3 is coupled with the input end 4a of the measurement target optical fiber 4 randomly varies. When the measurement target optical fiber 4 has the MDL, the optical powers detected by the light receiver 32 also vary randomly.

The analysis unit 34 includes, for example, a CPU and a memory that stores an analysis program. The analysis unit 34 analyzes the variations in the optical powers detected by the light receiver 32 during a period in which the mode coupled state in the excitation optical fiber 3 is changing by the disturbance application, and obtains the MDL of the measurement target optical fiber 4 based on the magnitude of the variations in the insertion loss (loss from the input end of the excitation optical fiber 3 to the light receiver 32) obtained from the optical power variations. This analysis is specifically as follows.

The light receiver 32 obtains detection values $P_1$, $P_2$, ..., $P_M$ (M is an integer of 2 or more) by repeatedly detecting an optical power P at fixed time intervals, for example. The analysis unit 34 obtains an insertion loss $A_m$ (=$P_m/P_0$) by taking a ratio between each detection value $P_m$ (in is an integer of 1 or more and M or less) and an input optical power $P_0$. The analysis unit 34 specifies a maximum value $A_{max}$ and a minimum value $A_{min}$ among insertion losses $A_1$, $A_2$, ..., and $A_M$, and obtains a ratio ($A_{max}/A_{min}$) between the maximum value and the minimum value as the MDL of the measurement target optical fiber 4. Note that, when the input optical power $P_0$ is constant (when the variations in the output powers of the light source 31 or the loss of the coupling optical fiber 2 is small), the analysis unit 34 can obtain a maximum value $P_{max}$ and a minimum value $P_{min}$ among the detection values $P_1$, $P_2$, ..., and $P_M$, and can obtain a ratio ($P_{max}/P_{min}$) between the maximum value and the minimum value as the MDL of the measurement target optical fiber 4.

The MDL obtained here is not exactly the MDL of only the measurement target optical fiber 4, but is a combination of the MDLs of the measurement target optical fiber 4 and the excitation optical fiber 3. Accordingly, in order to obtain the MDL of the measurement target optical fiber 4, it is necessary to set a length L4 of the measurement target optical fiber 4 to be sufficiently larger than a length L3 of the excitation optical fiber 3. Specifically, L4/L3 is preferably 10 or more, and more preferably 100 or more.

In the excitation optical fiber 3, it is necessary to disperse the powers in all the coupled cores by causing sufficient mode coupling. Thus, the length L4 of the measurement target optical fiber 4 is preferably 10 times or more, more preferably 100 times or more a mode coupling length of the excitation optical fiber 3. Since the mode coupling length is usually 10 m or less, the length L3 of the excitation optical fiber 3 is preferably 100 m or more, more preferably 1 km or more. The length L4 of the measurement target optical fiber 4 is preferably 1 km or more, and more preferably 100 km or more.

The mode coupling length of the excitation optical fiber 3 is often unknown in advance. In such a case, before or after the MDL measurement, it is desirable that the optical powers are outputted from the cores at a substantially equal ratio by capturing a mode distribution of the light beams outputted from the excitation optical fiber 3 by a camera or the like or measuring an average value of the optical powers detected by optically coupling the cores of the excitation optical fiber with the light receiver selectively or a ratio between the average value and a fluctuation width. At this time, when the optical powers outputted from the cores are not equal to each other, it is desirable that the excitation optical fiber 3 is lengthened or the intensity of the disturbance applied to the excitation optical fiber 3 increases.

Figure 4:
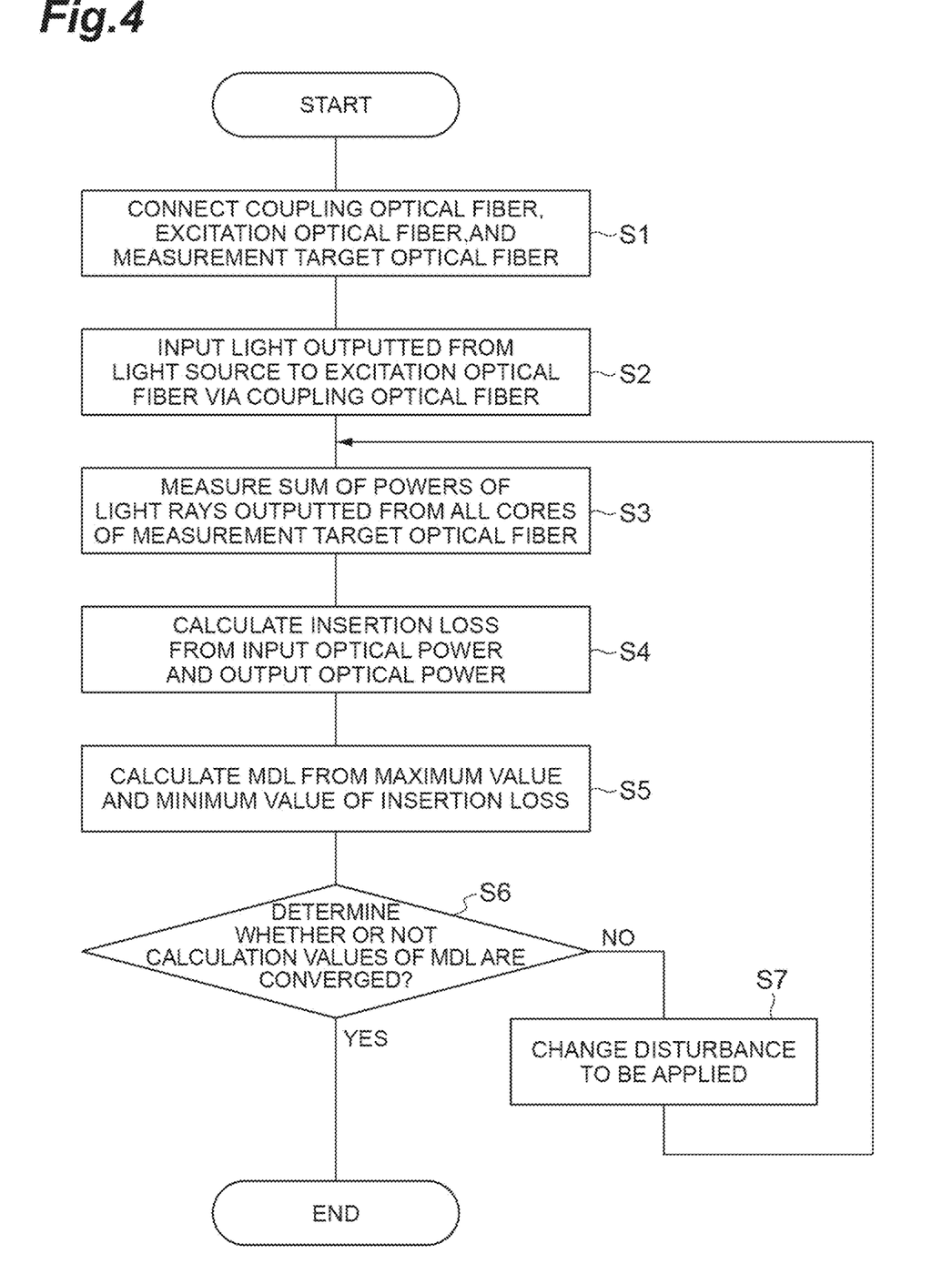
FIG. 4 is a flowchart of a mode-dependent loss measurement method according to the first embodiment.

FIG. 4 is a flowchart of a mode-dependent loss measurement method (MDL measurement method) according to the first embodiment.

In step S1, the excitation optical fiber and the coupling optical fiber are prepared and are connected in addition to the measurement target optical fiber. The coupling optical fiber may not be connected. The excitation optical fiber may be connected to the measurement target optical fiber, and the input end side portion of the measurement target optical fiber may be used as the excitation optical fiber.

In step S2, the light having a predetermined wavelength and a predetermined power outputted from the light source is inputted to the excitation optical fiber via the coupling optical fiber. The light beams outputted after propagating through the excitation optical fiber are coupled with the measurement target optical fiber. That is, the outputted light beams from the excitation optical fiber are outputted from the output end after propagating through the measurement target optical fiber. At this time, the disturbance is applied to the excitation optical fiber.

In step S3, the sum $P_m$ of the powers of the light beams outputted from the measurement target optical fiber is measured by the light receiver. In step S4, the insertion loss $A_m$ is obtained from the input optical power $P_0$ and the output optical power $P_m$. The insertion loss is obtained as a time function, and in step S5, the MDL is obtained by obtaining the ratio ($A_{max}/A_{min}$) from the maximum value $A_{max}$ and the minimum value $A_{min}$ of the series of variations in the insertion loss $A_m$ from a measurement start point in time to this corresponding point in time.

In step S6, the convergence of the MDL calculation values is determined from the series of MDL calculation values up to this corresponding point in time. In many cases, the MDL calculation values are converged with an accuracy of three significant digits. When the convergence has not yet been achieved, the wavelength of the light beams or the disturbance to the excitation optical fiber is changed in step S7, and step S3 and subsequent steps are repeated. When the convergence is achieved, a measured value of the MDL is confirmed. Since the wavelength of the light beams and the power distribution of the excitation optical fiber are a closed set, the convergence can be achieved within a finite time.

Figure 5:
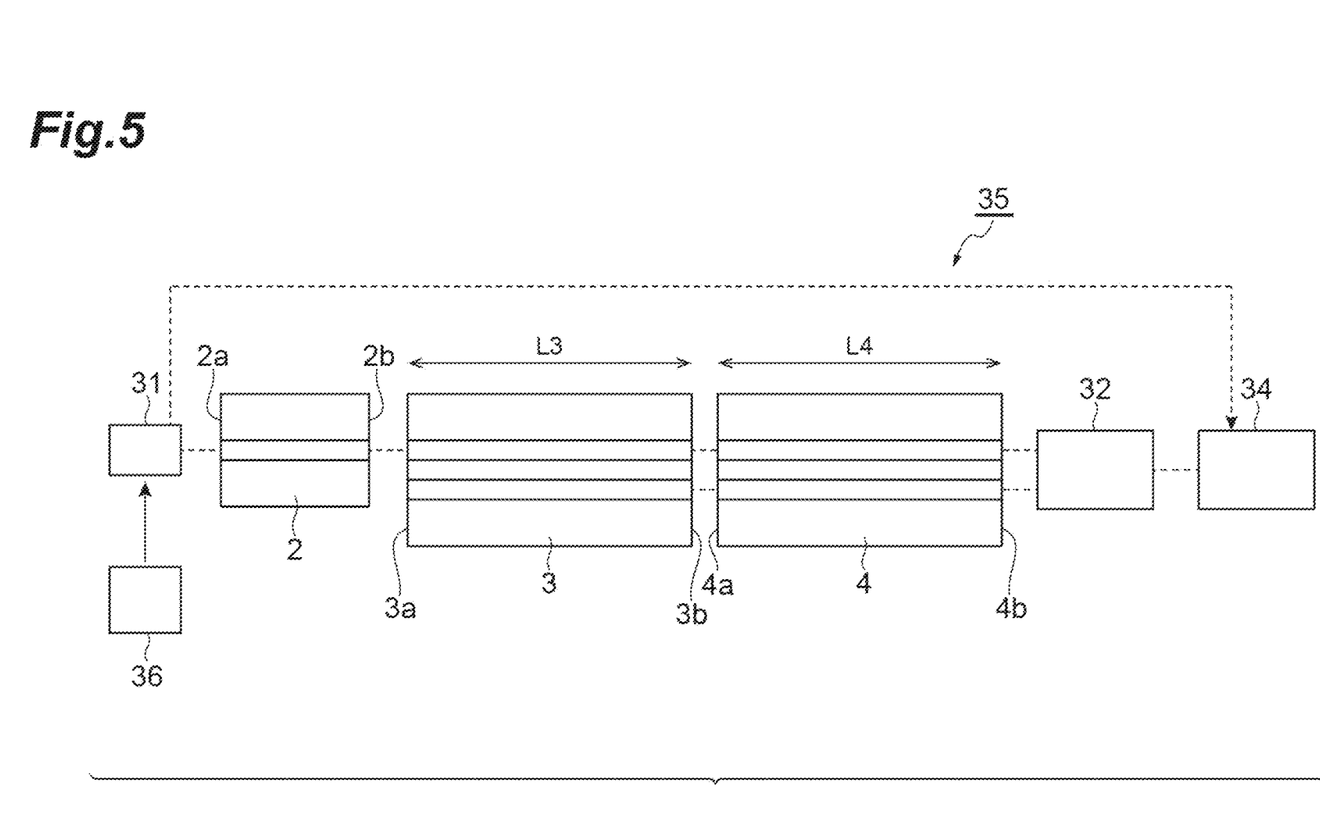
FIG. 5 is a diagram illustrating a configuration of a mode-dependent loss measurement device 35 according to a second embodiment together with an excitation optical fiber and a measurement target optical fiber.

FIG. 5 is a diagram illustrating a configuration of a mode-dependent loss measurement device (MDL measurement device) 35 according to a second embodiment together with an excitation optical fiber and a measurement target optical fiber. The MDL measurement device 35 includes a light source 31, a light receiver 32, a wavelength change unit 36 as mode coupled state change means, and an analysis unit 34. A coupling optical fiber 2, an excitation optical fiber 3, and a measurement target optical fiber 4 are arranged in order from the light source 31 toward the light receiver 32. Functions and operations of the light source 31, the light receiver 32, and the analysis unit 34 are the same as those of the first embodiment.

The mode coupled state of the excitation optical fiber 3 varies depending on the wavelength of the propagating light. In order to change the mode coupled state in step S2 of FIG. 4, the wavelength of the light outputted from the light source 31 can be changed by changing a driving condition of the light source 31 by the wavelength change unit 36.

In the first embodiment and the second embodiment, since it is not necessary to measure transmittance for each spatial mode, it is possible to solve the problem that the MDL when the mode is branched becomes an error factor. The configuration of the measurement device is simple. Accordingly, the MDL of the CMCF can be measured at low cost by suppressing an error due to the MDL caused by the mode branch.

Figure 6:
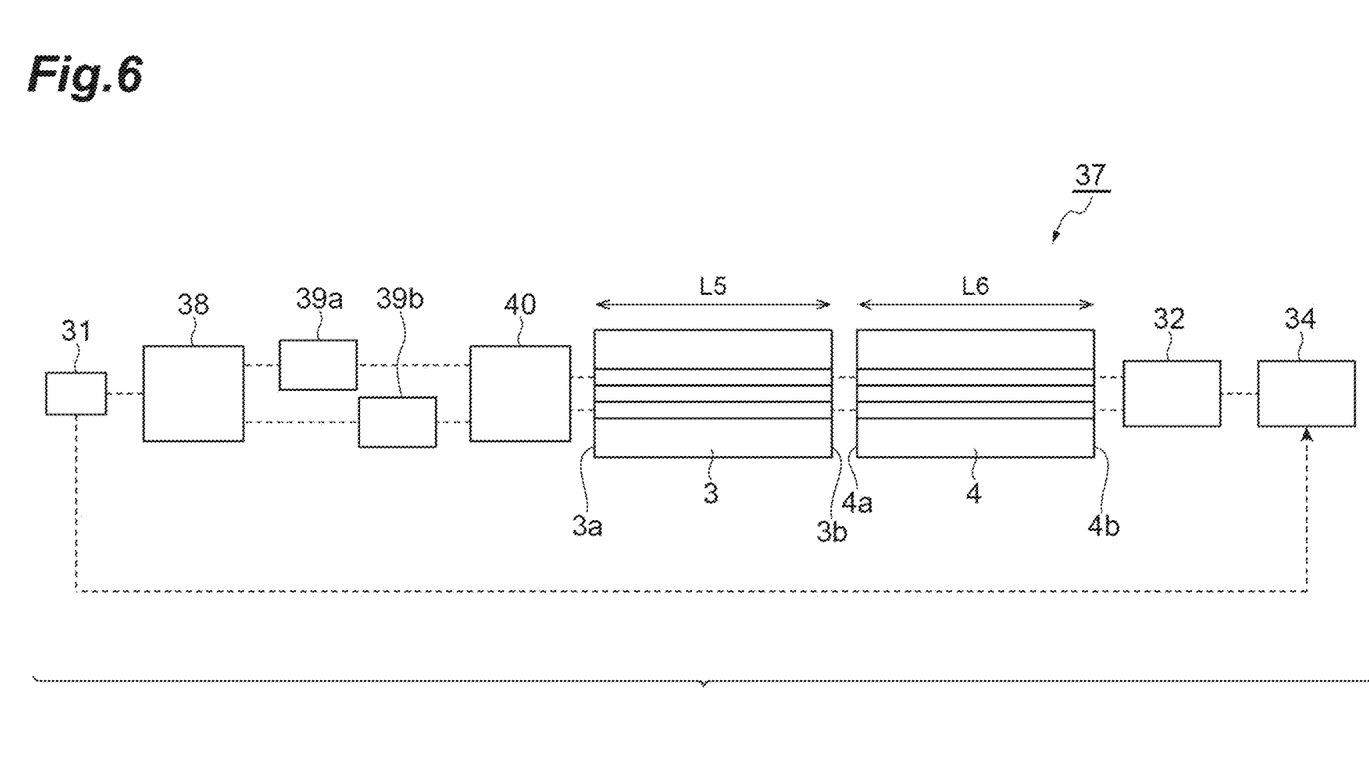

FIG. 6 is a diagram illustrating a configuration of a mode-dependent loss measurement device (MDL measurement device) 37 according to a third embodiment together with an excitation optical fiber and a measurement target optical fiber. The MDL measurement device 37 includes a light source 31, a light receiver 32, optical phase change units 39a and 39b (phase modulation means) as mode coupled state change means, and an analysis unit 34. An optical branch device 38, the optical phase change units 39a and 39b, a multi-core fan-out device 40, the excitation optical fiber 3, and the measurement target optical fiber 4 are arranged in order from the light source 31 toward the light receiver 32. Functions and operations of the light source 31, the light receiver 32, and the analysis unit 34 are the same as those of the first embodiment.

After the light outputted from the light source 31 is branched into a plurality of optical paths which is two or more by the optical branch device 38, optical phases are changed in the two optical phase change units 39a and 39b, and thereafter, the plurality of optical paths is coupled with the plurality of cores of the excitation optical fiber 3 by the multi-core fan-out device 40, respectively. The mode coupled state in the excitation optical fiber 3 varies depending on a phase difference between the light beams propagating through the plurality of cores. Accordingly, a case where the phases of the two light beams are changed by the optical phase change units 39a and 39b corresponds to a case where the mode coupled state is changed in step S2 of FIG. 4 (phase modulation step).

It is preferable that the optical phase change units 39a and 39b apply a periodic phase change of a predetermined frequency and the light receiver 32 detects an optical power changing at a predetermined frequency. It is more preferable that the two optical phase change units 39a and 39b apply periodic phase changes of predetermined different frequencies and the light receiver 32 detects an optical power changing at a frequency corresponding to a difference between the two predetermined frequencies. By such frequency-selective detection, for example, an error can be suppressed by distinguishing between an error due to an optical power change due to a cause other than the mode-dependent loss such as the power variation of the light source, an error due to an optical power change parasitic in a phase change unit, and an optical power change due to the mode-dependent loss at the frequency.

Although the first, second, and third embodiments have different mode coupled state change means of these embodiments, a plurality of combinations of the mode coupled state change means may be used as the mode coupled state change means. At this time, as described above, at least one mode coupled state may be periodically changed at a predetermined frequency, and the optical power changing at the predetermined frequency or a frequency corresponding to a difference between two predetermined frequencies may be detected. Accordingly, the error can be suppressed.

REFERENCE SIGNS LIST

1 . . . CMCF (coupled multi-core optical fiber); 2 . . . coupling optical fiber; 3 . . . excitation optical fiber; 4 . . . measurement target optical fiber: 10 . . . core; 11 . . . common cladding; 30, 35, 37 . . . mode-dependent loss measurement device (MDL measurement device); 31 . . . light source; 32 . . . light receiver; 33 . . . disturbance application unit; 34 . . . analysis unit; 36 . . . wavelength change unit; 38 . . . optical branch device; 39a, 39b . . . optical phase change unit; and 40 . . . multi-core fan-out device.

The invention claimed is:

1. A mode-dependent loss measurement device configured to measure a mode-dependent loss of a measurement target optical fiber including a coupled multi-core optical fiber having a plurality of cores extending along a fiber axis and a common cladding surrounding the plurality of cores, the device comprising:
a light source configured to be optically coupled with an input end of an excitation optical fiber including a coupled multi-core optical fiber having a plurality of cores extending along a fiber axis and a cladding surrounding the plurality of cores, the light source configured to input light to the input end of the excitation optical fiber;
a light receiver optically coupled with an output end of the measurement target optical fiber, the light receiver detecting a sum of powers of outputted light beams from a plurality of core end faces positioned on the output end of the measurement target optical fiber during a period in which the light from the light source is inputted to the input end of the excitation optical fiber in a state in which an output end of the excitation optical fiber and an input end of the measurement target optical fiber are optically coupled with each other;
a mode coupled state change means for changing a mode coupled state of the excitation optical fiber; and
an analysis unit comprising a CPU and a memory configured to analyze variations in optical powers detected by the light receiver during a period in which the mode coupled state of the excitation optical fiber is changing, and obtain the mode-dependent loss of the measurement target optical fiber from the variations in the detected optical powers.

2. The mode-dependent loss measurement device according to claim 1, wherein
the mode coupled state change means includes a disturbance application unit comprising a heater or a piezoelectric element configured to change the mode coupled state of the excitation optical fiber by application of disturbance.

3. The mode-dependent loss measurement device according to claim 1, wherein
the mode coupled state change means includes a wavelength changer configured to change a wavelength of the light outputted from the light source.

4. The mode-dependent loss measurement device according to claim 1, wherein
the mode coupled state change means includes a phase modulation means for changing one or more phases of phases of light beams propagating through the plurality of cores in the excitation optical fiber.

5. The mode-dependent loss measurement device according to claim 1, wherein
the mode coupled state change means includes at least two elements of a first element configured to change the mode coupled state of the excitation optical fiber by application of disturbance, a second element configured to change a wavelength of the light outputted from the light source, and a third element configured to change one or more phases of phases of light beams propagating through the plurality of cores in the excitation optical fiber, and wherein
the analysis unit selectively extracts a frequency component of the variations in the detected optical powers based on a frequency synchronized with a change in the mode coupled state caused by an operation of at least one element of the elements included in the mode coupled state change means in order to analyze the variations in the detected optical powers.

6. The mode-dependent loss measurement device according to claim 1, wherein
the excitation optical fiber includes a part of the coupled multi-core optical fiber which is the measurement target optical fiber.

7. A mode-dependent loss measurement method for measuring a mode-dependent loss of a measurement target optical fiber including a coupled multi-core optical fiber having a plurality of cores extending along a fiber axis and a common cladding surrounding the plurality of cores, the method comprising:
a light input step of inputting light from a light source to an input end of an excitation optical fiber, the light source optically coupled with the input end of the excitation optical fiber including a coupled multi-core optical fiber having a plurality of cores extending along a fiber axis and a common cladding surrounding the plurality of cores;
a light detection step of detecting a sum of powers of outputted light beams from a plurality of core end faces positioned on an output end of the measurement target optical fiber by a light receiver optically coupled with the output end of the measurement target optical fiber during a period in which the light from the light source is being inputted to the input end of the excitation optical fiber in a state in which an output end of the excitation optical fiber and an input end of the measurement target optical fiber are optically coupled with each other;
a mode coupled state change step of changing a mode coupled state of the excitation optical fiber; and
an analysis step of analyzing variations in optical powers detected by the light receiver during a period in which the mode coupled state of the excitation optical fiber is changing, and obtaining a mode-dependent loss of the measurement target optical fiber from the variations in the detected optical powers.

8. The mode-dependent loss measurement method according to claim 7, wherein
the mode coupled state change step includes a disturbance application step of changing the mode coupled state of the excitation optical fiber by application of disturbance.

9. The mode-dependent loss measurement method according to claim 7, wherein
the mode coupled state change step includes a wavelength change step of changing a wavelength of the light outputted from the light source.

10. The mode-dependent loss measurement method according to claim 7, wherein
the mode coupled state change step includes a phase modulation step of changing one or more phases of phases of light beams propagating through the plurality of cores of the excitation optical fiber.

11. The mode-dependent loss measurement method according to claim 7, wherein
the mode coupled state change step includes at least two sub-steps of a first sub-step of changing the mode coupled state of the excitation optical fiber by application of disturbance, a second sub-step of changing a wavelength of the light outputted from the light source, and a third sub-step of changing one or more phases of phases of light beams propagating through the plurality of cores in the excitation optical fiber, and wherein
in the analysis step, a frequency component of the variations in the detected optical powers is selectively extracted based on a frequency synchronized with a change in the mode coupled state caused by an operation of at least one sub-step of the sub-steps included in the mode coupled state change step in order to analyze the variations in the detected optical powers.

12. The mode-dependent loss measurement method according to claim 7, wherein
the excitation optical fiber includes a part of the coupled multi-core optical fiber which is the measurement target optical fiber.

13. The mode-dependent loss measurement method according to claim 7, wherein
a length of the measurement target optical fiber is 10 times or more of a length of the excitation optical fiber.

* * * * *